US011151191B2

(12) United States Patent
Hsieh et al.

(10) Patent No.: US 11,151,191 B2
(45) Date of Patent: Oct. 19, 2021

(54) VIDEO CONTENT SEGMENTATION AND SEARCH

(71) Applicant: International Business Machines Corporation, Armonk, NY (US)

(72) Inventors: Tsai-Hsuan Hsieh, Taoyuan (TW); Peter Wu, New Taipei (TW); Chiwen Chang, Taipei (TW); Allison Yu, Taipei (TW); Ching-Chun Liu, Taipei (TW); Kate Lin, Tainan (TW)

(73) Assignee: International Business Machines Corporation, Armonk, NY (US)

( * ) Notice: Subject to any disclaimer, the term of this patent is extended or adjusted under 35 U.S.C. 154(b) by 112 days.

(21) Appl. No.: 16/378,870

(22) Filed: Apr. 9, 2019

(65) Prior Publication Data

US 2020/0327160 A1 Oct. 15, 2020

(51) Int. Cl.
*G06F 16/30* (2019.01)
*G06F 16/732* (2019.01)
(Continued)

(52) U.S. Cl.
CPC .......... *G06F 16/7328* (2019.01); *G06F 16/71* (2019.01); *G06F 16/7844* (2019.01);
(Continued)

(58) Field of Classification Search
CPC .. G06F 16/7328; G06F 16/71; G06F 16/7844; G06K 9/00744; G06K 9/00765; H04N 21/23418; H04N 21/234336; H04N 21/26603; H04N 21/4884; H04N 21/84; H04N 21/8456

See application file for complete search history.

(56) References Cited

U.S. PATENT DOCUMENTS 6,608,930 B1 * 8/2003 Agnihotri ............ G06K 9/3266
382/176
8,713,618 B1 * 4/2014 Kuznetsov ........ H04L 29/06027
725/93
(Continued)

OTHER PUBLICATIONS

Article entitled "Video Manga: Generating Semantically Meaningful Video Summaries", by Uchihashi et al., dated Oct. 1999.*
(Continued)

*Primary Examiner* — Mahesh H Dwivedi
(74) *Attorney, Agent, or Firm* — Timothy J. Singleton

(57) ABSTRACT

A method for video content searching is provided. The method accesses video content and segments the video content into a plurality of frames. The method identifies one or more characteristics for at least a portion of frames of the plurality of frames and determines time frames for each characteristic of the one or more characteristics within the portion of the frames. The method generates frame keywords for the plurality of frames based on the one or more characteristics. The method assigns at least one frame keyword to each time frame within the portion of the frames and generates an index store for the video content. The index store is generated based on the frame keywords and assigning the at least one frame keyword to each frame. The index store includes the frame keywords and time frames assigned to the frame keywords.

20 Claims, 8 Drawing Sheets

(51) Int. Cl.
*G06K 9/00* (2006.01)
*H04N 21/845* (2011.01)
*G06F 16/783* (2019.01)
*H04N 21/488* (2011.01)
*G06F 16/71* (2019.01)

(52) U.S. Cl.
CPC ..... *G06K 9/00744* (2013.01); *G06K 9/00765* (2013.01); *H04N 21/4884* (2013.01); *H04N 21/8456* (2013.01)

(56) References Cited

U.S. PATENT DOCUMENTS

| | | | |
|---|---|---|---|
| 8,892,572 B2 | 11/2014 | Sanjeev | |
| 10,701,434 B1* | 6/2020 | Jindal | G06N 20/10 |
| 2008/0046925 A1* | 2/2008 | Lee | G06F 16/7335 |
| | | | 725/37 |
| 2008/0193016 A1* | 8/2008 | Lim | G06K 9/00711 |
| | | | 382/190 |
| 2010/0318532 A1* | 12/2010 | Sznajder | G06F 16/71 |
| | | | 707/759 |
| 2011/0113444 A1* | 5/2011 | Popovich | G11B 27/034 |
| | | | 725/32 |
| 2011/0208722 A1* | 8/2011 | Hannuksela | G06F 16/489 |
| | | | 707/723 |
| 2012/0237182 A1* | 9/2012 | Eyer | H04N 21/44008 |
| | | | 386/241 |
| 2014/0064693 A1* | 3/2014 | Deshpande | H04N 9/8205 |
| | | | 386/230 |
| 2014/0188834 A1 | 7/2014 | Guo | |
| 2014/0214885 A1* | 7/2014 | Park | G06F 16/783 |
| | | | 707/769 |
| 2014/0270708 A1* | 9/2014 | Girgensohn | H04N 9/79 |
| | | | 386/282 |
| 2014/0300758 A1* | 10/2014 | Tran | H04N 5/225 |
| | | | 348/207.1 |
| 2015/0310894 A1* | 10/2015 | Stieglitz | G11B 27/327 |
| | | | 386/241 |
| 2016/0110877 A1* | 4/2016 | Schwartz | G06F 16/7867 |
| | | | 382/107 |
| 2017/0357853 A1 | 12/2017 | Castanon et al. | |
| 2018/0068189 A1 | 3/2018 | Daliyot | |
| 2018/0300557 A1 | 10/2018 | Rodenas et al. | |
| 2018/0301169 A1* | 10/2018 | Ricciardi | G06F 16/784 |
| 2019/0095465 A1* | 3/2019 | Zhai | G06F 16/532 |
| 2019/0273837 A1* | 9/2019 | Townsend | H04N 1/2108 |
| 2019/0289372 A1* | 9/2019 | Merler | G06N 3/04 |
| 2019/0356948 A1* | 11/2019 | Stojancic | H04N 21/234336 |
| 2020/0242385 A1* | 7/2020 | Scott | G06T 7/13 |

OTHER PUBLICATIONS

Article entitled "Multi-Search of Video Segments Indexed by Time-Aligned Annotations of Video Content", by Coden et al., dated Nov. 18, 1998.*

Article entitled "Video Question Answering via Gradually Refined Attention over Appearance and Motion", by Xu et al., dated Oct. 27, 2017 (Year: 2017).*

Zhang et al., "An integrated system for content-based video retrieval and browsing", Pattern Recognition vol. 30, Issue 4, Apr. 1997, 16 pages.

Patel et al., "Content Based Video Retrieval", The International Journal of Multimedia & Its Applications (IJMA) vol. 4, No. 5, Oct. 2012, 22 pages, https://arxiv.org/ftp/arxiv/papers/1211/1211.4683.pdf.

* cited by examiner

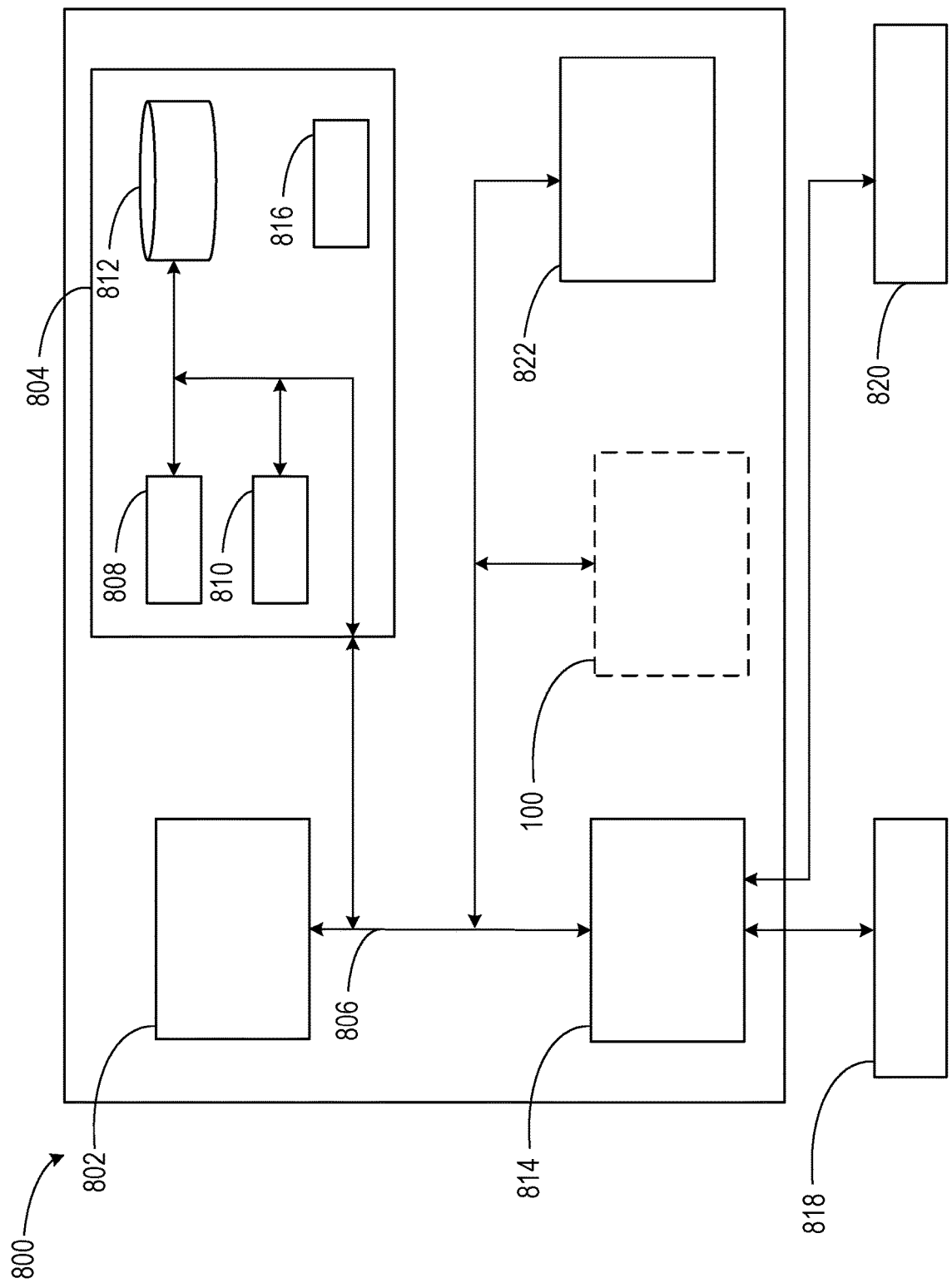

VIDEO CONTENT SEGMENTATION AND SEARCH

BACKGROUND

Computer systems and communications networks enable distribution or sharing and searching textual data for media files. Typically, current computing systems perform search functionality by matching keywords to titles and user generated descriptions of media files. These search functions miss relevant results which are incorrectly titled, captioned, or described. Further, these search functions often fail to identify relevant results within media files, where no manual description or titling reflects such portions of the media files.

SUMMARY

According to an embodiment described herein, a computer-implemented method for video content segmentation and searching is provided. The video content may be segmented by accessing video content and segmenting the video content into a plurality of frames. The method may identify one or more characteristics for at least a portion of frames of the plurality of frames. The method determines time frames for each characteristic of the one or more characteristics within the portion of the frames. Based on the one or more characteristics, the method generates frame keywords for the plurality of frames and assigns at least one frame keyword to each time frame within the portion of the frames. Based on the frame keywords and assigning the at least one frame keyword to each frame, the method generates an index store for the video content. The index store includes the frame keywords and time frames assigned to the frame keywords. In an embodiment, the index store is generated as metadata associated with the video content.

In some embodiments, the method comprises generating image captions for one or more frames within the video content. The image captions may be based on the frame keywords and the time frames. The method incorporates text for the image captions for the video content into the index store.

In some embodiments, generating the index store further comprises generating a time series frame index. The time series frame index may include keywords associated with movement. The method may generate one or more image indexes. The one or more image indexes may include keywords associated with image attributes of the video content.

In some embodiments, the method comprises receiving a search query within a user interface. The search query may contain one or more search terms. The method may determine a search type associated with each search term within the search query. The method may search the video content based on the search type associated with the search terms within the search query. Joint search results may then be generated based on the search type and the search terms of the search query. In some embodiments, joint search results are generated with the frame keywords and the time frames of the index store. Joint search results may also be generated based on all or a portion of the search type, the search terms of the search query, the frame keywords of the index store, and the time frames of the index store.

In some embodiments, the search type for at least one search term is associated with movement. Searching the video content based on the search type may further include identifying a time series frame index for the video content. The method may compare the at least one search term with one or more frame keywords within the time series frame index and generate a partial search result indicating at least one time frame within the video content.

In some embodiments, the search type for at least one search term is associated with object attributes and searching the video content based on the search type may further include identifying one or more image indexes for the video content. The method compares the at least one search term with one or more frame keywords within the one or more image indexes and generates a partial search result. The partial search result may indicate at least one time index associated with a frame having a frame keyword associated with the at least one search term.

Some embodiments of the inventive concepts described herein may take the form of a system or a computer program product. For example, a computer program product may store program instructions that, when executed by one or more processors of a computing system, cause the computing system to perform operations described above with respect to the computer implemented method. By way of further example, the system may comprise components, such as processors and computer readable storage media. The computer readable storage media may interact with other components of the system to cause the system to execute program instructions comprising operations of the computer implemented method, described herein. For the purpose of this description, a computer-usable or computer-readable medium may be any apparatus that may contain means for storing, communicating, propagating or transporting the program for use, by, or in connection, with the instruction execution system, apparatus, or device.

BRIEF DESCRIPTION OF THE DRAWINGS

FIG. 8 depicts a block diagram of a computing system for segmenting and distributing media, according to at least one embodiment.

DETAILED DESCRIPTION

Figure 1:
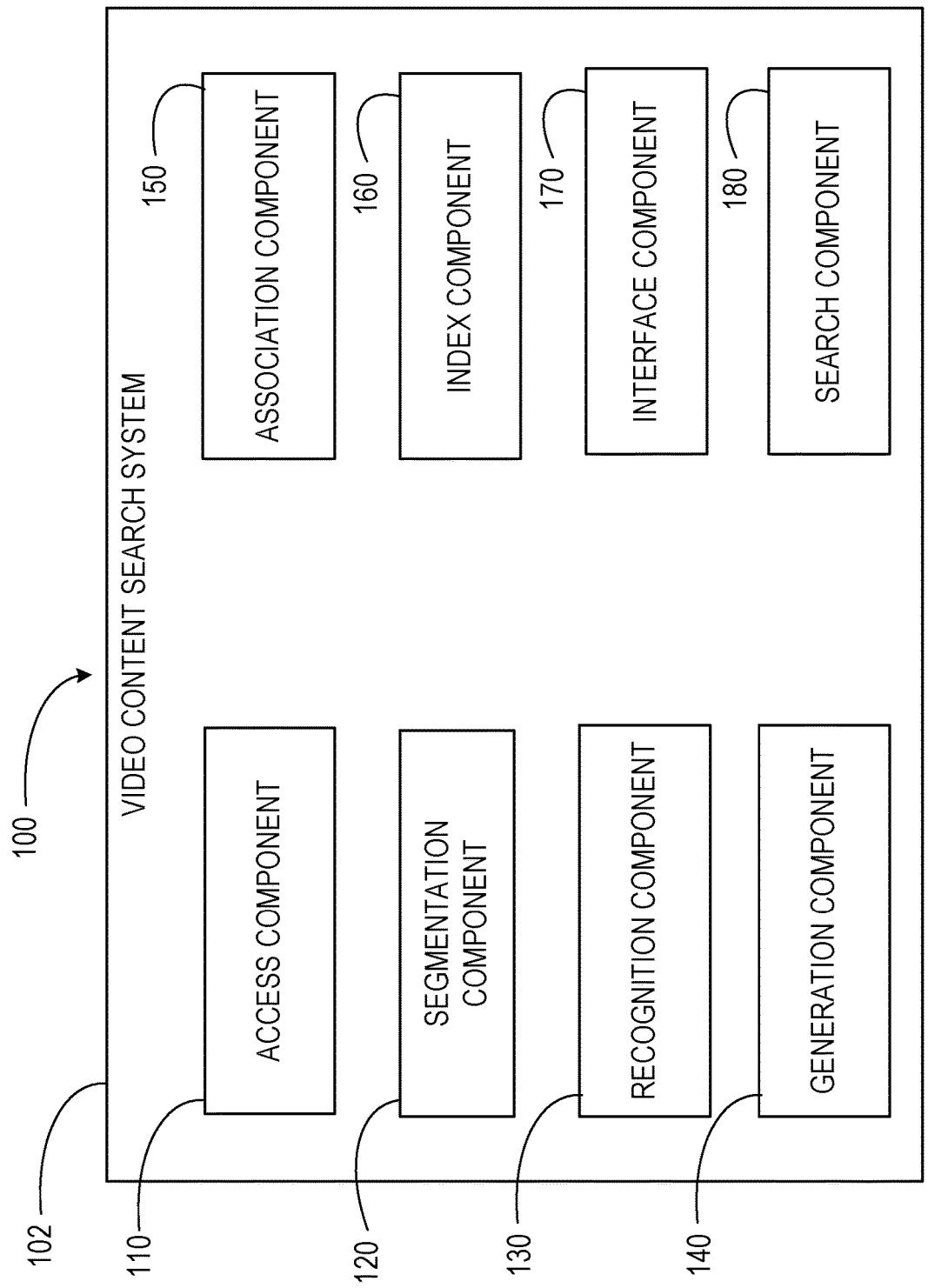
FIG. 1 depicts a block diagram of a computing environment for implementing concepts and computer-based methods, according to at least one embodiment.

The present disclosure relates generally to a method for searching media, and more specifically, but not exclusively, to a computer-implemented method for segmenting and searching video content. The present disclosure relates further to a related system for segmenting and searching video content, and a computer program product.

Media files, such as video content, are widely shared between users via multiple communications methods and made available for access across networks (e.g., the internet). With the introduction of social media platforms, the proliferation of video content continues to grow. Video content often presents difficulty for search engines and search functionality within a website or networked resource. Commonly, searching is performed by searching titles, comments, or metadata associated with video content. Some search engines apply search techniques to transcriptions provided by video content creators or third-party services. Despite commonly used search techniques, searching within a video remains difficult. Further, searching for specific actions, objects, backgrounds, or other information conveyed visually, within the video content, is generally outside of the functionality provided by current text-based searching methods. For example, a search for a "woman driving a red sports car on a road" may receive no relevant results from a video search, where the search engine or techniques are limited to searching titles, comments, and metadata.

Inventive concepts within the present disclosure present a video content search and segmentation system which allows users to search video content for visually depicted concepts, context, interest, dimensions, and other suitable information. Embodiments of the video content search system analyze video content, dynamically find continuity and differentiability within the video content, and provide multi-dimensional results. In some embodiments, the video content search system analyzes content by individual frames, sets of frames, time, or other relevant segments generated within video content. The video content search system may then determine continuity and differentiability among frames by identified or specified dimensions. The multi-dimensional search results may be provided based on frame position, time segments, time frames, or other suitable segments generated within the video content.

In embodiments, the video content search system receives search queries (e.g., search terms or phrases) from users. The video content search system identifies video content, or portions thereof, including dimensions, content, context, or other information matching at least a portion of the search queries. The video content search system may also identify times, time frames, video frames, or groups of frames, within the video content, matching at least a portion of the search queries. The video content search system may then provide the video content, or relevant portions thereof, in multi-dimensional results to a search query.

Referring now to FIG. 1, a block diagram of an example computing environment 100 is shown. The present disclosure may be implemented within the example computing environment 100. In some embodiments, the computing environment 100 may be included within or embodied by a computer system, described below. The computing environment 100 may comprise a video content search system 102. The video content search system 102 may comprise an access component 110, a segmentation component 120, a recognition component 130, a generation component 140, an association component 150, an index component 160, an interface component 170, and a search component 180. The access component 110 may access video content for segmentation and search. The segmentation component 120 may segment video content into frames or sets of frames. The recognition component 130 may perform image recognition operations on frames or sets of frames segmented by the segmentation component 120. The generation component 140 may generate frame keywords based on the segmentation and recognition of frames or sets of frames. The association component 150 may assign frame keywords to time frames or frames of the video content. The index component 160 may generate index stores, associated with frames or sets of frames of the video content. The interface component 170 may identify user interactions with a user interface and pass instructions to one or more other components of the video content search system 102. The search component 180 may receive search queries and perform search operations on the video content using the index stores.

Figure 2:
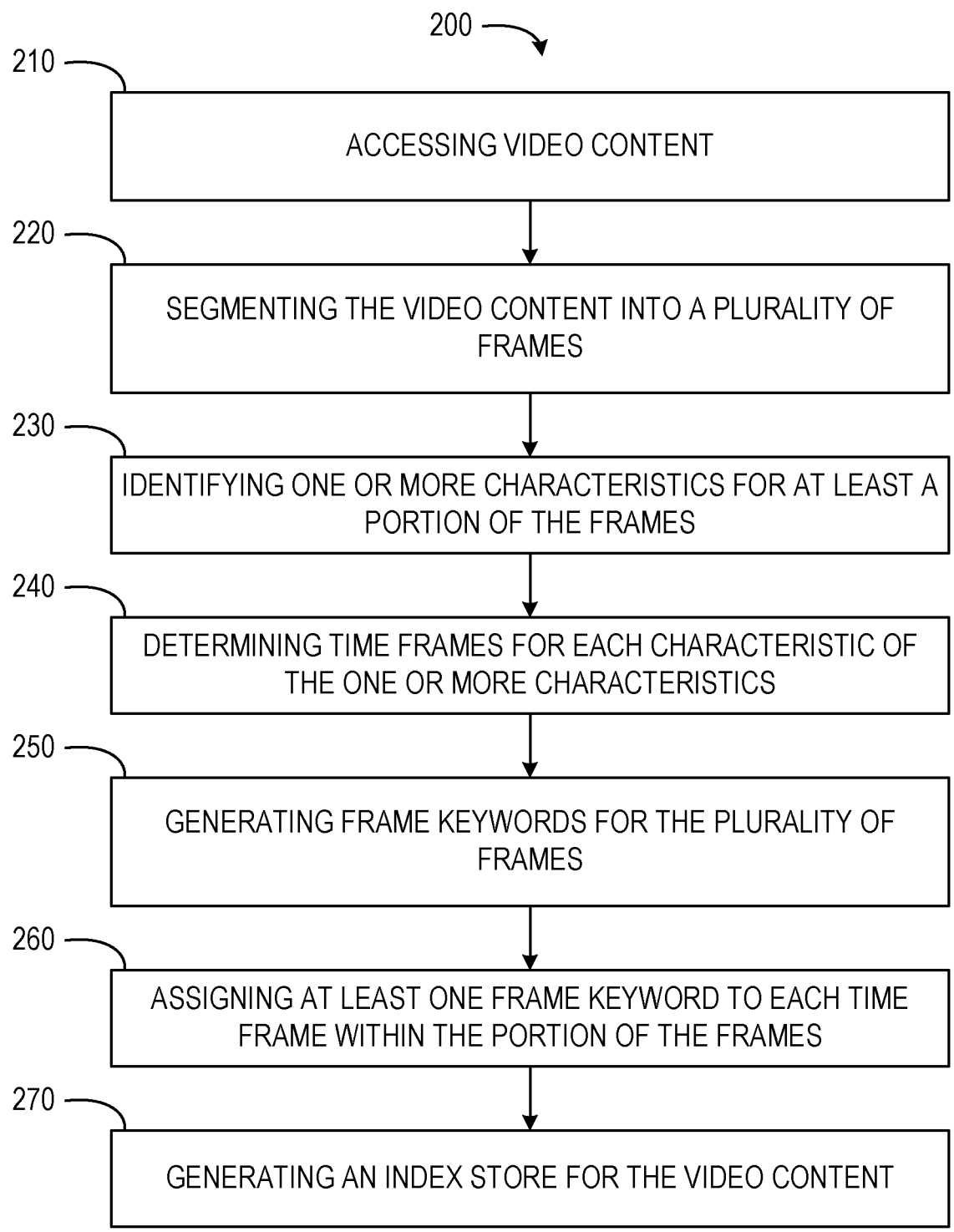
FIG. 2 depicts a block diagram of a computer-implemented method for video content segmentation and search, according to at least one embodiment.

Referring now to FIG. 2, a block diagram of a computer-implemented method 200 is shown. The computer-implemented method 200 is a method for video content segmentation and search. In some embodiments, the computer-implemented method 200 may be performed by one or more components of the computing environment 100, as described in more detail below.

At operation 210, the access component 110 accesses video content. In some embodiments, the access component 110 accesses the video content on a database, a networked resource, a server, or any other suitable repository of video content or data. Access of the video content may be triggered by upload of the video content to the suitable repository, a notification of new video content from the repository, a periodic access (e.g., access responsive to time, storage considerations, etc.), or any other suitable trigger event. In some instances, the access component 110 may access the video content directly, via one or more messages transmitting the video content or a link to a networked resource containing the video content. In some embodiments, the access component 110 accesses the video content in response to a search request. For example, the access component 110 may interact with a search engine or search functionality for a specified networked resource or web site. The access component 110 may access the video content in response to receiving one or more search terms or keywords from the search engine or search functionality. The access component 110 may access one or more sets of video content based on the keywords, where video content has been, at least partially, organized or associated with specified keywords. The access component 110 may also access the video content of the repository without regard to the keywords, passing the keywords and access to the video content to one or more components of the video content search system 102.

At operation 220, the segmentation component 120 segments the video content into a plurality of frames. In some embodiments, the segmentation component 120 segments the video content in response to the access component 110 accessing the video content. The segmentation component 120 may be provided access to the video content or provided a copy of the video content by the access component 110.

The segmentation component 120 may be configured for image encoding. In some embodiments, the segmentation component 120 includes one or more machine learning models trained as an autoencoder. The autoencoder, or models included therein, may be a convolutional neural network, a recurrent neural network, a long short term memory network (LSTM), combinations thereof, or any other suitable model configured to perform operations described herein in the present disclosure. Recurrent neural networks may incorporate loops to enable persistent information. The persistent information may be passed between operations of the recurrent neural network, and inform classification operations of the autoencoder as the autoencoder proceeds through the video content. In some embodiments, the LSTM may be understood as a type of recurrent neural network. The LSTM may have similar ability to learn informational dependencies, while avoiding long-term dependency issues. The LSTM may employ multiple neural network layers to selectively add or remove information from a loop or cell state via gate structures.

The autoencoder may learn data compression for video content during a machine learning training process. In some instances, the segmentation component 120 compresses the video content from an input layer or the access component 110 into a short code. The segmentation component 120 may later uncompress the short code into video content that matches or is substantially similar to the video content initially accessed by the access component 110 and the segmentation component 120. In some embodiments, the image encoding portion of the segmentation component 120 is subdivided into portions. The three portions may be individual machine learning models, a single machine learned model, individual processes and functionality, a single integrated process and functionality, or combinations of any one or more of the above. In some embodiments, the image encoding of the segmentation component 120 is subdivided into an encoder, a latent-space module, and decoder. The encoder may compress or down sample input into fewer numbers of bits. The latent-space module may comprise the compressed bits which represent the original input. The decoder may reconstruct the input using the encoding of the input (e.g., the compressed bits).

The segmentation component 120 may use the encoder to segment the video content. Initially, the video content may comprise a set of frames or images. Segmentation of the video content may be performed by dividing the video content into individual video frames or images. The segmentation component 120 may then pass the frames, or a subset thereof, to one or more components of the video content search system 102. In embodiments where a subset of frames are passed to other components, the segmentation component 120 may select a portion of the frames within the video content to be analyzed by one or more components of the video content search system 102. The segmentation component 120 may select frames for analysis based on differences or similarity between frames, time segments or time codes of frames, combinations thereof, or any other suitable selection metric or technique.

At operation 230, the recognition component 130 identifies one or more characteristics for at least a portion of frames of the plurality of frames. In some embodiments, the segmentation component 120 includes modules configured to use the image encoding framework described above. The modules of the segmentation component 120 may include an image model. The image model may be an image recognition model, a machine learning model, a convolutional neural network, a recurrent neural network, LSTM, combinations thereof, or any other suitable model configured to identify characteristics, elements, patterns, subjects, nuances, and other aspects within frames from the segmentation component 120. The image model may comprise or include known image recognition techniques capable of analyzing images.

At operation 240, the recognition component 130 determines time frames for each characteristic of the one or more characteristics within the portion of the frames. In some instances, the recognition component 130 determines time frames during or as a sub-operation of one or more other operations, such as operation 220. In some embodiments, the recognition component 130 determines time frames for each characteristic by grouping subsets of frames including a same characteristic. The recognition component 130 may access metadata associated with each frame or frames within a grouped subset of frames to determine a range of time (e.g., a time frame or initial and terminal time codes) for a specified characteristic within the video content. In some embodiments, the recognition component 130 determines time frames for each characteristic by determining the frames in which the characteristic is present. The recognition component 130 may then compare frame information with the video content to determine time coding information (e.g., hour, minute, and/or second at which the frame occurs within the video content) for each frame. The recognition component 130 may then construct a time frame for the characteristic by determining a beginning time and an ending time associated with the first frame and the last frame at which the characteristic is present within the video content.

At operation 250, the generation component 140 generates frame keywords for the plurality of frames. The generation component 140 may generate the frame keywords based on the one or more characteristics or in response to identification of the one or more characteristics. The generation component 140 may cooperate with the recognition component 130, or be included therewith, to generate the frame keywords for the plurality of frames.

In some embodiments, the image model is configured to generate, or surface, keywords associated with identified characteristics within each frame of the portion of frames. The image model may identify the one or more characteristics and match the one or more characteristics to words known to the image model. In some instances, the words known to the image model may be words associated with characteristics used for training the image model (e.g., labeled training sets).

In some embodiments, the generation component 140 may generate frame keywords using a language model. The language model may be part of or associated with the image model, such as embodiments where the image model is at least a part of the recognition component 130. The language model may translate features, objects, aspects, nuances, subjects, or other characteristics, identified by the image model, into natural language segments. The natural language segments of the language model may include frame keywords, sentences, or other recognizable language segments.

In some embodiments, the language model is a LSTM model. The language model may be trained on pairs of video content or frames and sentences. During training, the language model learns to associate a sequence of video frames to a sequence of words. The training enables the language model to generate a description of an event within video content, a portion of video content, a set of frames, or an individual frame. In some embodiments, a first layer of the language model (e.g., a top LSTM layer) models visual feature inputs from a video sequence or video content. A second layer of the language model models language given a text input and a hidden representation of the video sequence or content. Where no input is provided to the language model from a specified time frame or time code, the generation component 140 may insert a value, such as "padstr." The value may be a null value, a place holder value, or any other suitable value.

At operation 260, the association component 150 assigns at least one frame keyword to each time frame within the portion of the frames. In some embodiments, the association component 150 assigns the at least one frame keyword to each time frame by generating an association between each frame keyword and each time frame identified for that frame keyword. The association component 150 may generate the associations or assignments by generating metadata to be associated with the video content.

Figure 3:
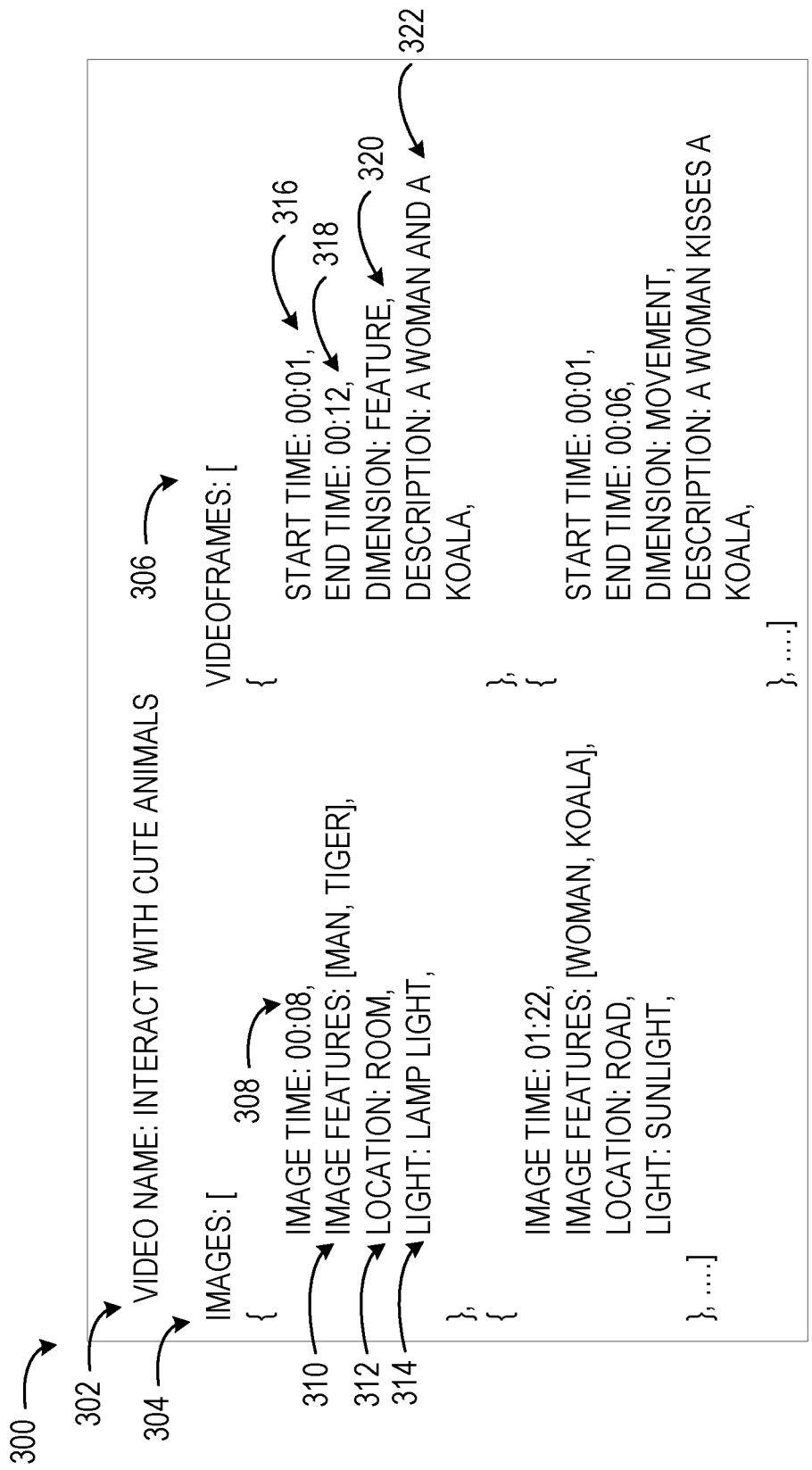
FIG. 3 shows an index store for video content segmentation and search, according to at least one embodiment.

At operation 270, the index component 160 generates an index store for the video content. The index component 160 may generate the index store based on the frame keywords and assigning the at least one frame keyword to each frame. In some embodiments, the index component 160 generates the index store in response to assignment of the at least one frame keyword to each frame. The index store includes the frame keywords and time frames assigned to the frame keywords. The index store may be generated as metadata for the video content. For example, as shown in FIG. 3, an index store 300 may comprise a content title 302, information for one or more images 304, information for frame sets 306. The information for the one or more images 304 may include times 308 at which the image occurs in video content, features 310 of the image 304, location information 312, and other information 314. The information for frame sets 306 may include a start time 316, an end time 318, frame set dimensions 320, and frame set descriptions 322.

Once generated, the metadata may be associated with the video content or portions thereof. In some embodiments, the index store includes features of frames of the video, identified locations, contextual descriptions, lighting, ambiance, natural language descriptions, combinations thereof, or any other suitable information identified by one or more of the components of the video content search system 102.

In some embodiments, generating the index store includes generating a time series frame index. The time series frame index may be generated with keywords associated with movement. The time series frame index may indicate one or more of a start time for the movement, an end time for the movement, a duration of the movement, a description of the movement, a frame location of the movement, one or more characteristics of the movement, combinations thereof, or any other information suitable to qualitatively or quantitatively describe movement occurring within one or more frames of the video content.

In some embodiments, generating the index store includes generating one or more image indexes with keywords associated with image attributes. The image attributes may occur in one or more frames of the video content. In some embodiments, the one or more image indexes include one or more of a frame designation, a time code (e.g., a time within the video content at which the frame occurs), image description, image characteristics, lighting, location, combinations thereof, and any other suitable information capable of describing objects or aspects within an image.

Figure 4:
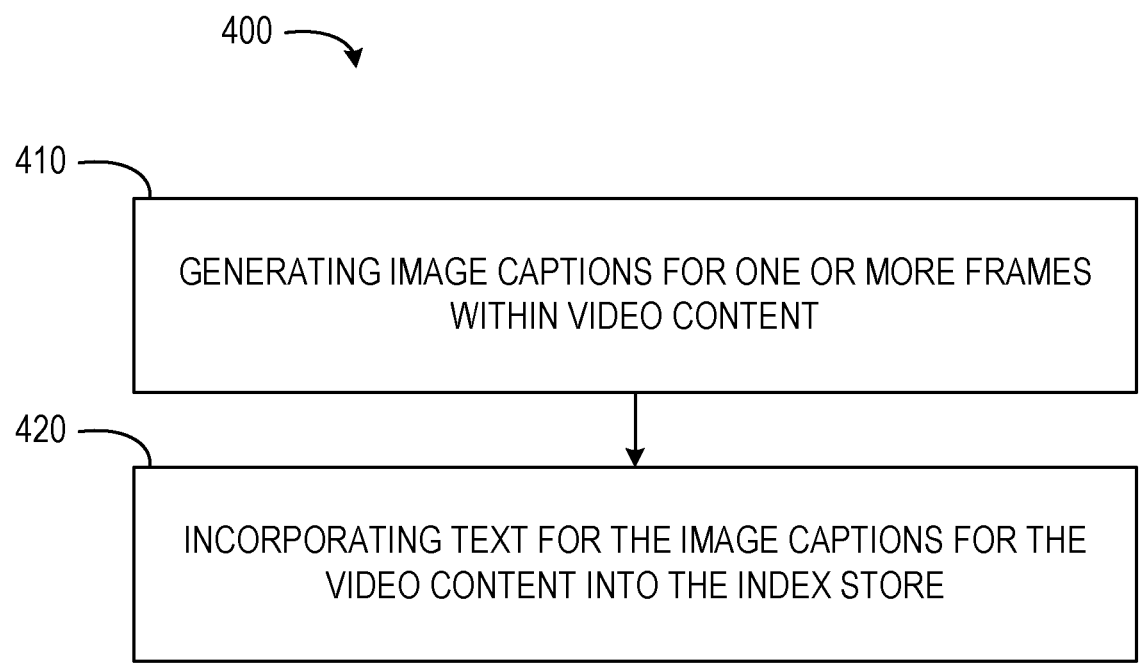
FIG. 4 depicts a block diagram of a computer-implemented method for video content segmentation and search, according to at least one embodiment

FIG. 4 shows a block diagram of an embodiment of a computer-implemented method 400 for video content segmentation and search. The method 400 may be performed by or within the computing environment 100. In some embodiments, the method 400 comprises or incorporates one or more operations of the method 200. In some instances, operations of the method 400 may be incorporated as part of or sub-operations of the method 200.

In operation 410, the generation component 140 generates image captions for one or more frames within the video content. In some embodiments, the generation component 140 generates the image captions based on the frame keywords and the time frames. The generation component 140 may employ at least a portion of the autoencoder. The generation component 140 may generate the image captions by receiving as input the images or frames passing through a convolutional neural network. The image-based model of the autoencoder and the convolutional neural network may extract features, nuances, characteristics, and other keywords representing aspects of the image or objects depicted therein. Taking the features, nuances, and other information as input, the generation component 140 uses the language-based model to translate features into captions. In some embodiments, the captions are generated as natural language phrases. The phrases may include one or more words describing the features of the image. In some instances, the phrases comprise a natural language sentence. The language-based model may use a recurrent neural network, iteratively taking portions of features from previous images or previous layers of a model to generate the natural language phrases.

In operation 420, the index component 160 incorporates text for the image captions for the video content into the index store. Once the natural language phrases have been generated by the generation component 140, the index component 160 may incorporate the text of the image captions into the index store. As the video content is replayed, after inserting the text into the index store, the text may be portrayed on a display device. Portrayal of the text may be timed such that the text is displayed concurrent with the frames being described by the text. As described above, the index store may be generated and stored as metadata associated with the video content. In some instances, the index component 160 may modify the video content to incorporate the natural language text into a file of the video content.

Figure 5:
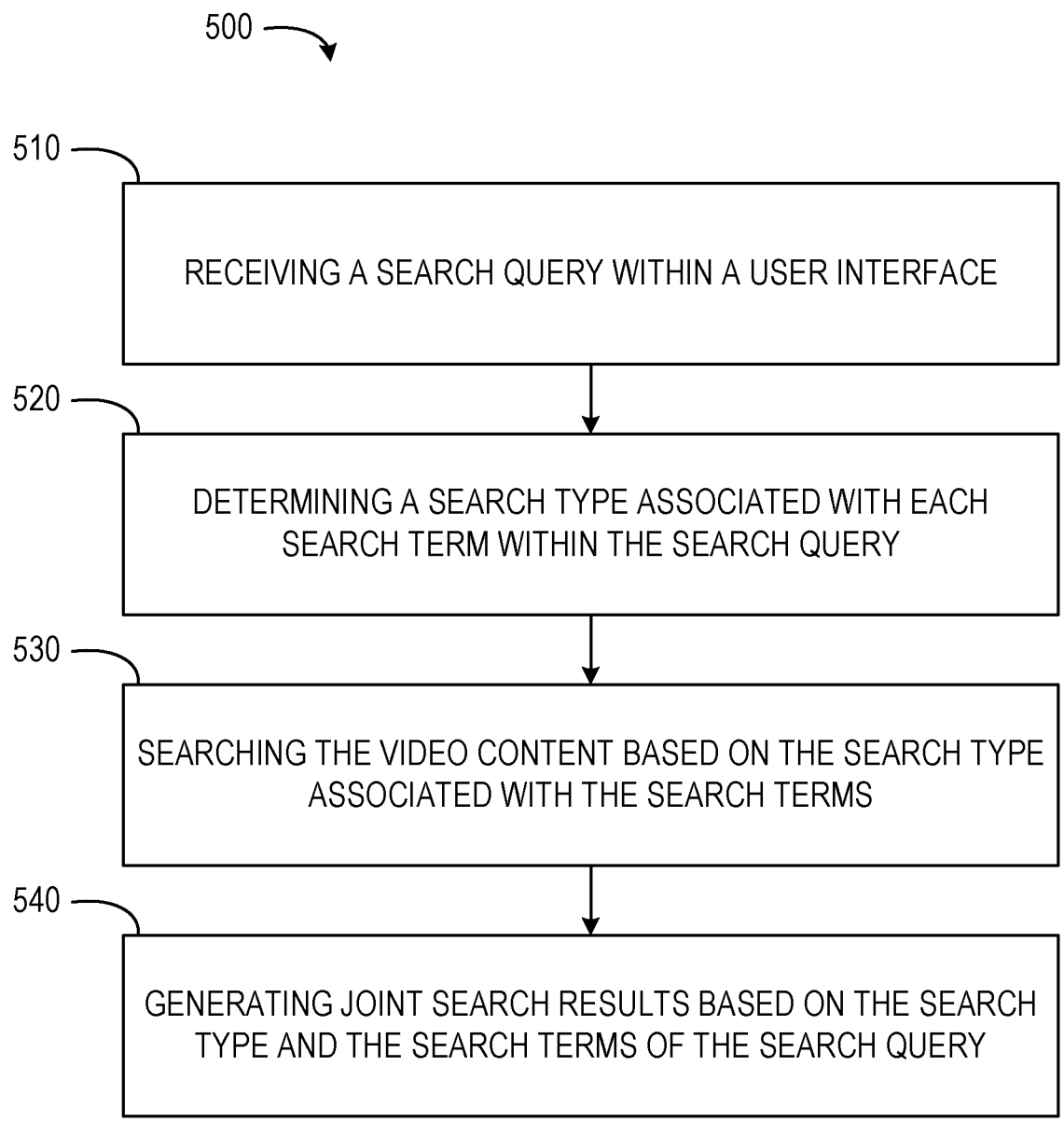
FIG. 5 depicts a block diagram of a computer-implemented method for video content segmentation and search, according to at least one embodiment.

FIG. 5 shows a block diagram of an embodiment of a computer-implemented method 500 for video content segmentation and search. The method 500 may be performed by or within the computing environment 100. In some embodiments, the method 500 comprises or incorporates one or more operations of the methods 200 or 400. In some instances, operations of the method 500 may be incorporated as part of or sub-operations of the methods 200 or 400.

In operation 510, the interface component 170 receives a search query within a user interface. The search query may contain one or more search terms. The search query may be received within a text entry field, one or more drop down menus, a touch screen interface, a voice command, combinations thereof, or any other suitable input mechanism, method, or interface. The search query may be a natural language query, a Boolean query, proximity query, truncation query, wildcard query, combinations thereof, or any other suitable search query type. The search terms may be selected from the search query by identifying Boolean or other operators indicating relationships between the search terms. In some embodiments, the interface component 170 or the search component 180 identifies the search terms, and interrelations between the search terms, of a natural language query using one or more natural language processing operations.

In operation 520, the search component 180 determines a search type associated with each search term within the search query. The search component 180 may determine the search type based on predetermined search types available to the search component 180. In some embodiments, search types include movement searches, object searches, attribute searches, combinations thereof, or any other suitable search type capable of identifying or describing one or more frames of the video content. The search type, determined by the search component 180, may be associated with one or more index stores. In such embodiments, the search component 180 may add the search type, or an indicator for the search type, into the search query prior to executing the search.

The search component 180 may also determine a plurality of search types included within the search query. The search component 180 may run a plurality of searches, with each search associated with an identified search type. The plurality of searches may be understood as partial searches producing partial search results. The partial search results from the plurality of searches may then be aggregated, appended, interwoven, pruned, combinations thereof, or otherwise combined to produce full search results. In some embodiments, the search component 180 determines an existence of a plurality of search types and determines a relative importance of the search types. For example, the search component 180 may receive a search query of "A woman in a red shirt hugs a koala." The search component 180 may determine a first search type (e.g., primary search type) as a movement search based, at least in part, on the verb "hug." The search component 180 may also determine a second search type (e.g., a secondary search type) as an attribute search based, at least in part, on the nouns "woman" and "koala" and the adjective "red."

In operation 530, the search component 180 searches the video content based on the search type associated with the search terms within the search query. In some embodiments, the search component 180 initially narrows the search based on the search type. For example, where index stores are divided between movement and attribute indexes, the search component 180 may prune attribute indexes from the search based on the search type indicating a movement type of search query.

In some embodiments, where the search component 180 determines a plurality of search types, the search component 180 searches each index store associated with a search type of the plurality of search types. The search component 180 may search each index store iteratively, sequentially, or in any other suitable manner. In some embodiments, the search component 180 searches the index stores associated with the plurality of search types based on a relative importance of the identified search types. For example, where the search types for movement and attribute have been identified, with the movement search type being primary, the search component 180 may initially search an index store associated with a movement search type, and then search an index store associated with an attribute search type.

In operation 540, the search component 180 generates joint search results based on the search type and the search terms of the search query. The search component 180 may incorporate, within the joint search results, results based on the frame keywords and the time frames of the index store. As noted above, where a plurality of search types are identified, partial search results from a first search type and partial search results from one or more subsequent search types may be combined into joint search results for presentation to a user via a user interface.

Figure 6:
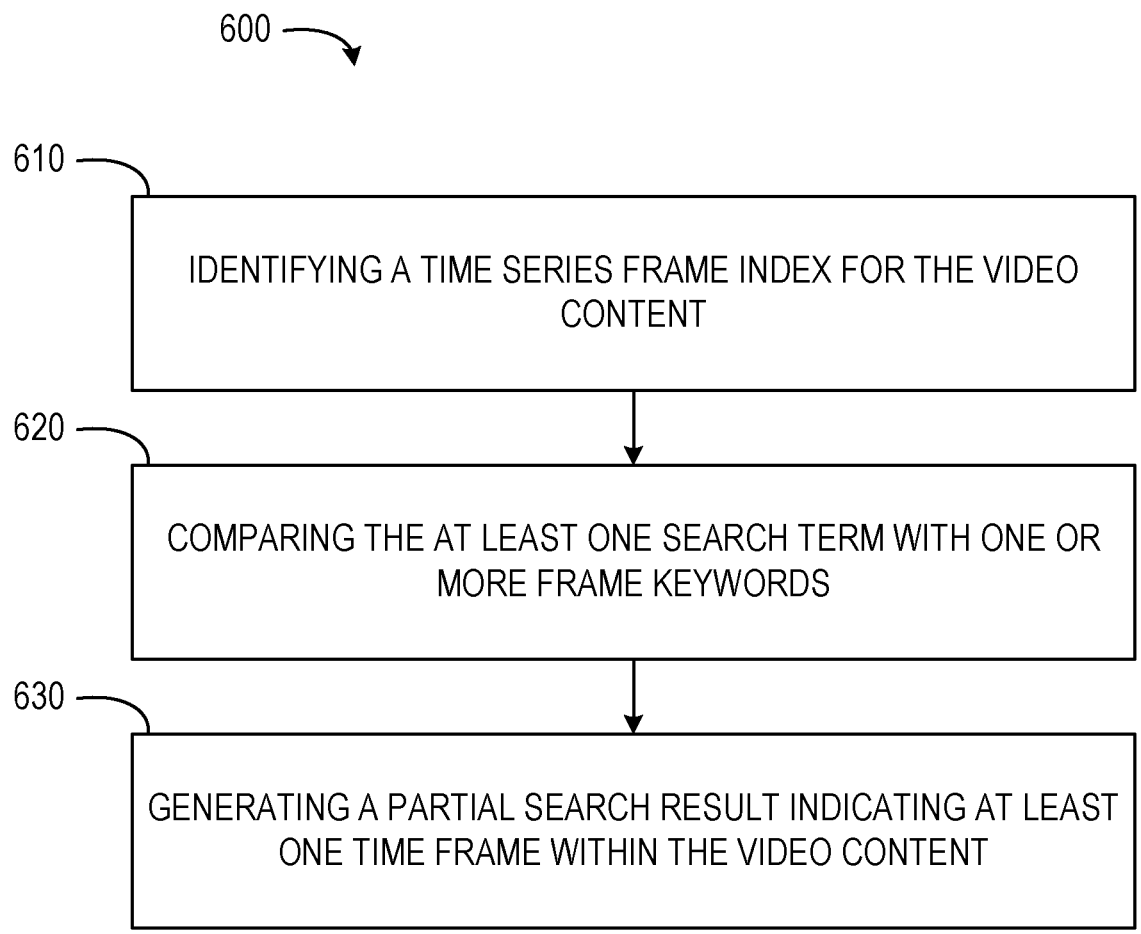
FIG. 6 depicts a block diagram of a computer-implemented method for video content segmentation and search, according to at least one embodiment.

FIG. 6 shows a block diagram of an embodiment of a computer-implemented method 600 for video content segmentation and search. The method 600 may be performed by or within the computing environment 100. In some embodiments, the method 600 comprises or incorporates one or more operations of the methods 200, 400, or 500. In some instances, operations of the method 600 may be incorporated as part of or sub-operations of the methods 200, 400, or 500.

In operation 610, the search component 180 identifies a time series frame index for the video content. The time series frame index may be an index store associated with movement within one or more frames of the video content. In some embodiments, the time series frame index includes one or more of a start time, an end time, one or more dimensions (e.g., a categorical description of movement), a description, combinations thereof, or any other suitable data describing movement of one or more objects within the video content. The search component 180 may identify the time series frame index as a set of metadata associated with the video content.

In some embodiments, the set of metadata includes a plurality of time series frame indexes. The search component 180 may identify the time series frame index my identifying a keyword, key phrase, natural language phrase, movement dimension, or time frame. In some instances, the search component 180 identifies a plurality of time series frame indexes sharing one or more similarities relating to the search query or search terms.

In operation 620, the search component 180 compares the at least one search term with one or more frame keywords within the time series frame index. Where the at least one search term and the one or more frame keywords or other descriptive elements are a match or are sufficiently related, the search component 180 may return frames identified by the time series frame index as a potential result. In embodiments where the search component 180 identifies a plurality of time series frame indexes, the search component 180 may pare the plurality of time series frame indexes into a subset of time series frame indexes. The subset of time series frame indexes may be one or more time series frame indexes having descriptors or frame keywords with a closest match to the at least one search term.

In operation 630, the search component 180 generates a partial search result indicating at least one time frame within the video content. The search component 180 may generate the partial search result by selecting one or more frames of the video content associated with the at least one time frame of the time series frame index identified in operation 610 and compared in operation 620. In some embodiments, the partial search results are presented via a user interface. For example, where a single search type is identified and is associated with the time series frame index, the partial search results may be a result set presented on a display device in response to receiving the search query. In some embodiments, the search component 180 incorporates the partial search result into a full result set. The full result set may include results from one or more video content, one or more portions of a single video content, one or more search types, and combinations thereof.

Figure 7:
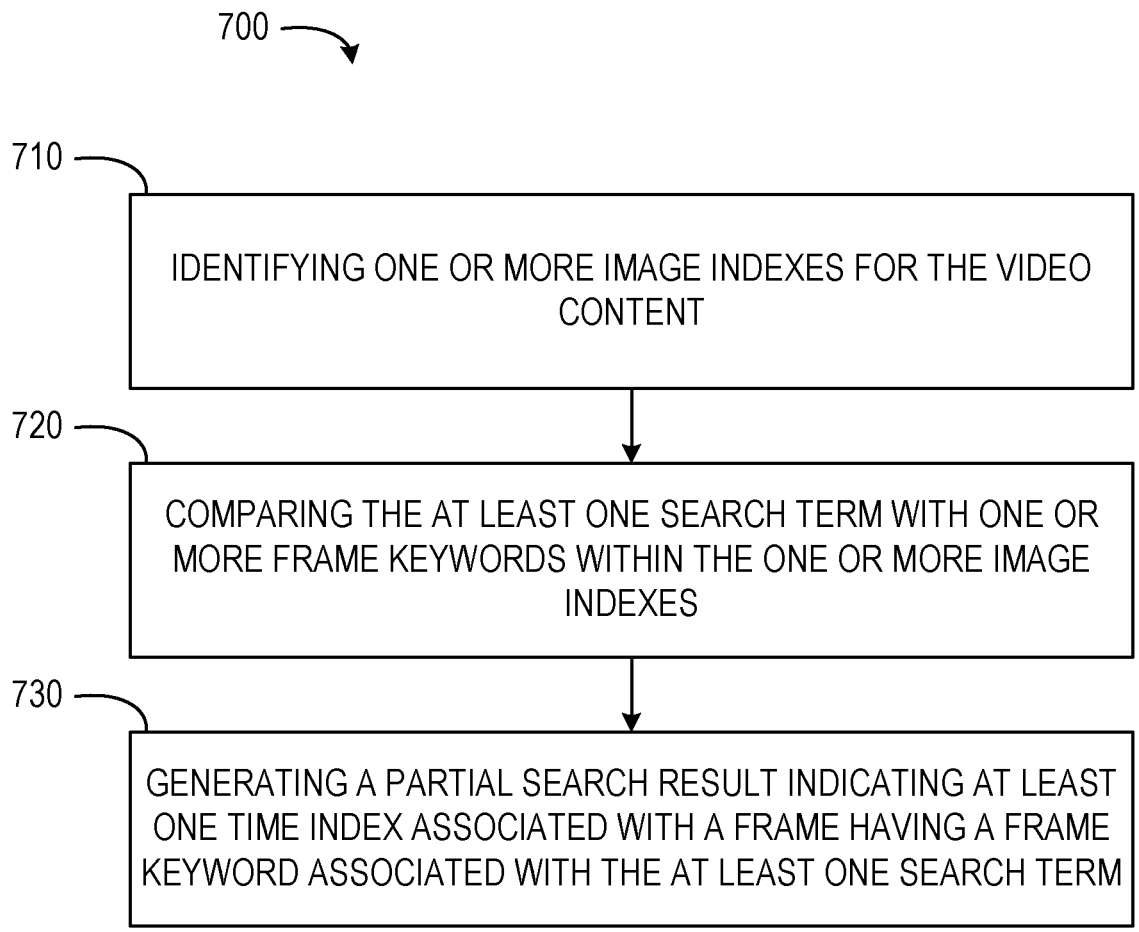
FIG. 7 depicts a block diagram of a computer-implemented method for video content segmentation and search, according to at least one embodiment.

FIG. 7 shows a block diagram of an embodiment of a computer-implemented method 700 for video content segmentation and search. The method 700 may be performed by or within the computing environment 100. In some embodiments, the method 700 comprises or incorporates one or more operations of the methods 200, 400, 500, or 600. In some instances, operations of the method 700 may be incorporated as part of or sub-operations of the methods 200, 400, 500, or 600.

In operation 710, the search component 180 identifies one or more image indexes for the video content. The one or more image indexes may be one or more index stores, or subsets of an index store, associated with attributes or objects depicted within frames of video content. In some embodiments, an image index includes an image time at which the frame appears in the video content, one or more image features (e.g., categories or keywords describing the image), location information, lighting information, context information, combinations thereof, or any other suitable information describing what is represented within a frame of the video content.

In operation 720, the search component 180 compares the at least one search term with one or more frame keywords within the one or more image indexes. The search component 180 may compare the at least one search term with one or more frame keywords within the one or more image indexes in a manner similar to or the same as described above with respect to operation 620.

In operation 730, the search component 180 generates a partial search result indicating at least one time index associated with a frame having a frame keyword associated with the at least one search term. The search component 180 generates the partial search result indicating the at least one time index of the one or more image indexes in a manner similar to or the same as described above with respect to operation 630. In some embodiments, the search component 180 combines partial search results generated in operation 630 with the partial search results generated for the one or more image indexes into a complete result set.

Embodiments of the present disclosure may be implemented together with virtually any type of computer, regardless of the platform being suitable for storing and/or executing program code. FIG. 8 shows, as an example, a computing system 800 suitable for executing program code related to the methods disclosed herein.

The computing system 800 is only one example of a suitable computer system and is not intended to suggest any limitation as to the scope of use or functionality of embodiments of the present disclosure described herein, regardless, whether the computer system 800 is capable of being implemented and/or performing any of the functionality set forth hereinabove. In the computer system 800, there are components, which are operational with numerous other general purpose or special purpose computing system environments or configurations. Examples of well-known computing systems, environments, and/or configurations that may be suitable for use with computer system/server 800 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 800 may be described in the general context of computer system-executable instructions, such as program modules, being executed by a computer system 800. Generally, program modules may include routines, programs, objects, components, logic, data structures, and so on that perform particular tasks or implement particular abstract data types. Computer system/server 800 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 800 is shown in the form of a general-purpose computing device. The components of computer system/server 800 may include, but are not limited to, one or more processors 802 (e.g., processing units), a system memory 804 (e.g., a computer-readable storage medium coupled to the one or more processors), and a bus 806 that couple various system components including system memory 804 to the processor 802. Bus 806 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 800 typically includes a variety of computer system readable media. Such media may be any available media that is accessible by computer system/server 800, and it includes both, volatile and non-volatile media, removable and non-removable media.

The system memory 804 may include computer system readable media in the form of volatile memory, such as random access memory (RAM) 808 and/or cache memory 810. Computer system/server 800 may further include other removable/non-removable, volatile/non-volatile computer system storage media. By way of example only, a storage system 812 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 806 by one or more data media interfaces. As will be further depicted and described below, the system memory 804 may include at least one program product having a set (e.g., at least one) of program modules that are configured to carry out the functions of embodiments of the present disclosure.

The program/utility, having a set (at least one) of program modules 816, may be stored in the system memory 804 by way of example, and not limiting, as well as an operating system, one or more application programs, other program modules, and program data. Program modules may include one or more of the access component 110, the segmentation component 120, the recognition component 130, the generation component 140, the association component 150, the index component 160, the interface component 170, and the search component 180. Each of the operating systems, one or more application programs, other program modules, and program data or some combination thereof, may include an implementation of a networking environment. Program modules 816 generally carry out the functions and/or methodologies of embodiments of the present disclosure, as described herein.

The computer system/server 800 may also communicate with one or more external devices 818 such as a keyboard, a pointing device, a display 820, etc.; one or more devices that enable a user to interact with computer system/server 800; and/or any devices (e.g., network card, modem, etc.) that enable computer system/server 800 to communicate with one or more other computing devices. Such communication can occur via Input/Output (I/O) interfaces 814. Still yet, computer system/server 800 may communicate with one or more networks such as a local area network (LAN), a general wide area network (WAN), and/or a public network (e.g., the Internet) via network adapter 822. As depicted, network adapter 822 may communicate with the other components of computer system/server 800 via bus 806. It should be understood that, although not shown, other hardware and/or software components could be used in conjunction with computer system/server 800. Examples include, but are not limited to: microcode, device drivers, redundant processing units, external disk drive arrays, RAID systems, tape drives, and data archival storage systems, etc.

The descriptions of the various embodiments of the present disclosure have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer-readable storage medium (or media) having computer readable program instructions thereon for causing a processor to carry out aspects of the present invention.

The computer-readable storage medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer-readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present disclosure has been presented for purposes of illustration and description, but is not intended to be exhaustive or limited to the present disclosure in the form disclosed. Many modifications and variations will be apparent to those of ordinary skills in the art without departing from the scope of the present disclosure. The embodiments are chosen and described in order to explain the principles of the present disclosure and the practical application, and to enable others of ordinary skills in the art to understand the present disclosure for various embodiments with various modifications, as are suited to the particular use contemplated.

What is claimed is:

1. A method, comprising:
   accessing video content;
   segmenting the video content into a plurality of frames;
   identifying a set of characteristics depicted within at least a portion of frames of the plurality of frames, the set of characteristics identified based on image recognition analysis of the plurality of frames using an autoencoder to detect one or more characteristics defining objects depicted within the portion of the frames using a first image recognition model and one or more characteristics describing movement of the objects within the portion of the frames using a second image recognition model;
   determining time frames for each characteristic of the set of characteristics within the portion of the frames, the time frames for each characteristic being determined by performing image recognition analysis of the video content using the autoencoder to group subsets of frames in which each characteristic is depicted based on a similarity of the set of characteristics depicted within two or more frames and determining a range of time for each subset of frames;
   based on the set of characteristics, generating frame keywords for the plurality of frames;
   assigning at least one frame keyword to each time frame within the portion of the frames; and
   based on the frame keywords and assigning the at least one frame keyword to each frame, generating an index store for the video content, the index store including the frame keywords and time frames assigned to the frame keywords.

2. The method of claim 1, wherein the index store is generated as metadata associated with the video content.

3. The method of claim 1, further comprising:
   based on the frame keywords and the time frames, generating image captions for one or more frames within the video content; and
   incorporating text for the image captions for the video content into the index store.

4. The method of claim 1, wherein generating the index store further comprises:
   generating a time series frame index with keywords associated with the movement; and
   generating one or more image indexes with keywords associated with image attributes.

5. The method of claim 1, further comprising:
   receiving a search query within a user interface, the search query containing one or more search terms;
   determining a search type associated with each search term within the search query;
   searching the video content based on the search type associated with the search terms within the search query; and
   generating joint search results based on the search type and the search terms of the search query and the frame keywords and the time frames of the index store.

6. The method of claim 5, wherein the search type for at least one search term is associated with movement and searching the video content based on the search type further comprises:
   identifying a time series frame index for the video content;
   comparing the at least one search term with one or more frame keywords within the time series frame index; and
   generating a partial search result indicating at least one time frame within the video content.

7. The method of claim 5, wherein the search type for at least one search term is associated with object attributes and searching the video content based on the search type further comprises:
   identifying one or more image indexes for the video content;
   comparing the at least one search term with one or more frame keywords within the one or more image indexes; and
   generating a partial search result indicating at least one time index associated with a frame having a frame keyword associated with the at least one search term.

8. A system, comprising:
   one or more processors; and
   a computer-readable storage medium, coupled to the one or more processors, storing program instructions that, when executed by the one or more processors, cause the one or more processors to perform operations comprising:
   accessing video content;
   segmenting the video content into a plurality of frames;
   identifying a set of characteristics depicted within at least a portion of frames of the plurality of frames, the set of characteristics identified based on image recognition analysis of the plurality of frames using an autoencoder to detect one or more characteristics defining objects depicted within the portion of the frames using a first image recognition model and one or more characteristics describing movement of the objects within the portion of the frames using a second image recognition model;

determining time frames for each characteristic of the one or more set of characteristics within the portion of the frames, the time frames for each characteristic being determined by performing image recognition analysis of the video content using the autoencoder to group subsets of frames in which each characteristic is depicted based on a similarity of the set of characteristics depicted within two or more frames and determining a range of time for each subset of frames;

based on the set of characteristics, generating frame keywords for the plurality of frames;

assigning at least one frame keyword to each time frame within the portion of the frames; and based on the frame keywords and assigning the at least one frame keyword to each frame, generating an index store for the video content, the index store including the frame keywords and time frames assigned to the frame keywords.

9. The system of claim 8, wherein the operations further comprise:
based on the frame keywords and the time frames, generating image captions for one or more frames within the video content; and
incorporating text for the image captions for the video content into the index store.

10. The system of claim 8, wherein generating the index store further comprises:
generating a time series frame index with keywords associated with the movement; and
generating one or more image indexes with keywords associated with image attributes.

11. The system of claim 8, wherein the operations further comprise:
receiving a search query, within a user interface, containing one or more search terms;
determining a search type associated with each search term within the search query;
searching the video content based on the search type associated with the search terms within the search query; and
generating joint search results based on the search type and the search terms of the search query and the frame keywords and the time frames of the index store.

12. The system of claim 11, wherein the search type for at least one search term is associated with movement and searching the video content based on the search type further comprises:
identifying a time series frame index for the video content;
comparing the at least one search term with one or more frame keywords within the time series frame index; and
generating a partial search result indicating at least one time frame within the video content.

13. The system of claim 11, wherein the search type for at least one search term is associated with object attributes and searching the video content based on the search type further comprises:
identifying one or more image indexes for the video content;
comparing the at least one search term with one or more frame keywords within the one or more image indexes; and generating a partial search result indicating at least one time index associated with a frame having a frame keyword associated with the at least one search term.

14. A computer program product comprising a computer readable storage medium having program instructions embodied therewith, the program instructions being executable by one or more processors to cause the one or more processors to perform operations comprising:
accessing video content;
segmenting the video content into a plurality of frames;
identifying a set of characteristics depicted within at least a portion of frames of the plurality of frames, the set of characteristics identified based on image recognition analysis of the plurality of frames using an autoencoder to detect one or more characteristics defining objects depicted within the portion of the frames using a first image recognition model and one or more characteristics describing movement of the objects within the portion of the frames using a second image recognition model;
determining time frames for each characteristic of the one or more set of characteristics within the portion of the frames, the time frames for each characteristic being determined by performing image recognition analysis of the video content using the autoencoder to group subsets of frames in which each characteristic is depicted based on a similarity of the set of characteristics depicted within two or more frames and determining a range of time for each subset of frames;
based on the set of characteristics, generating frame keywords for the plurality of frames;
assigning at least one frame keyword to each time frame within the portion of the frames; and
based on the frame keywords and assigning the at least one frame keyword to each frame, generating an index store for the video content, the index store including the frame keywords and time frames assigned to the frame keywords.

15. The computer program product of claim 14, wherein the index store is generated as metadata associated with the video content.

16. The computer program product of claim 14, wherein the operations further comprise:
based on the frame keywords and the time frames, generating image captions for one or more frames within the video content; and
incorporating text for the image captions for the video content into the index store.

17. The computer program product of claim 14, wherein generating the index store further comprises:
generating a time series frame index with keywords associated with the movement; and
generating one or more image indexes with keywords associated with image attributes.

18. The computer program product of claim 14, wherein the operations further comprise:
receiving a search query, within a user interface, containing one or more search terms;
determining a search type associated with each search term within the search query;
searching the video content based on the search type associated with the search terms within the search query; and
generating joint search results based on the search type and the search terms of the search query and the frame keywords and the time frames of the index store.

19. The computer program product of claim 18, wherein the search type for at least one search term is associated with movement and searching the video content based on the search type further comprises:
- identifying a time series frame index for the video content;
- comparing the at least one search term with one or more frame keywords within the time series frame index; and
- generating a partial search result indicating at least one time frame within the video content.

20. The computer program product of claim 18, wherein the search type for at least one search term is associated with object attributes and searching the video content based on the search type further comprises:
- identifying one or more image indexes for the video content;
- comparing the at least one search term with one or more frame keywords within the one or more image indexes; and
- generating a partial search result indicating at least one time index associated with a frame having a frame keyword associated with the at least one search term.

* * * * *